United States Patent
Scheifele et al.

(10) Patent No.: US 12,508,852 B2
(45) Date of Patent: *Dec. 30, 2025

(54) TIRE ELECTRONICS ASSEMBLY APPARATUS HAVING A MODULE CONFIGURED TO RELEASABLY MECHANICALLY ATTACH TO THE BASE OF THE TIRE

(71) Applicant: BRIDGESTONE AMERICAS TIRE OPERATIONS, LLC, Nashville, TN (US)

(72) Inventors: Kevin E. Scheifele, Atwater, OH (US); Hans R. Dorfi, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,066

(22) Filed: Jun. 5, 2024

(65) Prior Publication Data

US 2024/0317001 A1  Sep. 26, 2024

Related U.S. Application Data

(63) Continuation of application No. 17/631,885, filed as application No. PCT/US2020/043805 on Jul. 28, 2020, now Pat. No. 12,036,828.

(Continued)

(51) Int. Cl.
*B60C 23/04* (2006.01)
*B60C 19/00* (2006.01)

(52) U.S. Cl.
CPC .......... *B60C 23/0493* (2013.01); *B60C 19/00* (2013.01); *B60C 2019/004* (2013.01)

(58) Field of Classification Search
None
See application file for complete search history.

(56) References Cited

U.S. PATENT DOCUMENTS 6,462,650 B1 10/2002 Balzer et al.
7,954,367 B2 6/2011 Mancosu et al.
(Continued)

FOREIGN PATENT DOCUMENTS

CN      1867467 A    11/2006
DE  112016004602 T5   7/2018
(Continued)

OTHER PUBLICATIONS

International Search Report and Written Opinion issued in PCT/US20/43805, dated Oct. 30, 2020 (10 pages).

(Continued)

*Primary Examiner* — Peter J Macchiarolo
*Assistant Examiner* — Jermaine L Jenkins

(57) ABSTRACT

A tire electronics assembly includes a base and a plurality of modules. The base is mechanically attached to the tire and includes an electronic device. The base also includes a plurality of mechanical attachment elements arranged side-by-side in a row. Each module includes an electronic device and a mechanical attachment element. Each mechanical attachment element on a module is configured to releasably mechanically attach to any one of the mechanical attachment elements on the base. In this configuration, the modules are interchangeably mechanically attachable to the base in side-by side positions in row. The base further includes a plurality of electrical contacts arranged side-by-side in a row. Each module has an electrical contact that is configured to releasably electrically connect with any one of the electrical (Continued)

contacts on the base, whereby the modules are interchangeably electrically connectable with the base in side-by-side positions in a row.

20 Claims, 2 Drawing Sheets

Related U.S. Application Data

(60) Provisional application No. 62/882,786, filed on Aug. 5, 2019.

(56) References Cited

U.S. PATENT DOCUMENTS

| | | |
|---|---|---|
| 7,999,663 B2 | 8/2011 | Mancosu et al. |
| 8,742,265 B2 | 6/2014 | Weston et al. |
| 9,085,198 B2 * | 7/2015 | Weston .................. B60C 19/00 |
| 10,836,222 B2 | 11/2020 | Stewart et al. |
| 2005/0126668 A1 | 6/2005 | Fornerod et al. |
| 2011/0132649 A1 | 6/2011 | Weston et al. |
| 2017/0341475 A1 | 11/2017 | Urbin-Choffray |
| 2018/0297424 A1 | 10/2018 | Mori et al. |
| 2019/0047336 A1 | 2/2019 | Nagaya |

FOREIGN PATENT DOCUMENTS

| | | |
|---|---|---|
| EP | 3424754 A1 | 1/2019 |
| JP | 5933472 B2 * | 6/2016 |
| JP | 2017154648 A | 9/2017 |
| KR | 20170023606 A | 3/2017 |
| WO | 2019002747 A1 | 1/2019 |

OTHER PUBLICATIONS

International Preliminary Report on Patentability issued in PCT/US20/43805, dated Feb. 8, 2022 (8 pages).

* cited by examiner

TIRE ELECTRONICS ASSEMBLY APPARATUS HAVING A MODULE CONFIGURED TO RELEASABLY MECHANICALLY ATTACH TO THE BASE OF THE TIRE

CROSS-REFERENCE TO RELATED APPLICATIONS

This application claims priority from U.S. Provisional Patent Application No. 62/882,786, filed on Aug. 5, 2019, which is incorporated by reference herein in its entirety.

FIELD OF THE INVENTION

This technology includes electronic devices for sensing conditions of a tire on a vehicle.

BACKGROUND

Electronic devices can be used to sense conditions of a tire on a vehicle. Such devices include air pressure and temperature sensors that are mounted inside the tire, and also include radio frequency transmitters for transmitting pressure and temperature signals from the tire to the vehicle.

SUMMARY

An electronics assembly is provided for use with a tire. In a given example, the assembly includes a base and a plurality of modules. The base is mechanically attached to the tire and includes an electronic device. The base also includes mechanical attachment elements arranged side-by-side in a row. Each module includes an electronic device and a mechanical attachment element. Each mechanical attachment element on a module is configured to releasably mechanically attach to any one of the mechanical attachment elements on the base. In this configuration, the modules are interchangeably mechanically attachable to the base in side-by side positions in row.

The base further includes a plurality of electrical contacts arranged side-by-side in a row. Each module has an electrical contact that is configured to releasably electrically connect with any one of the electrical contacts on the base, whereby the modules are interchangeably electrically connectable with the base in side-by-side positions in a row.

In one example, the base is adhered to an inner surface of the tire. In another example, the base is installed between layers of the tire.

DETAILED DESCRIPTION

Figure 1:
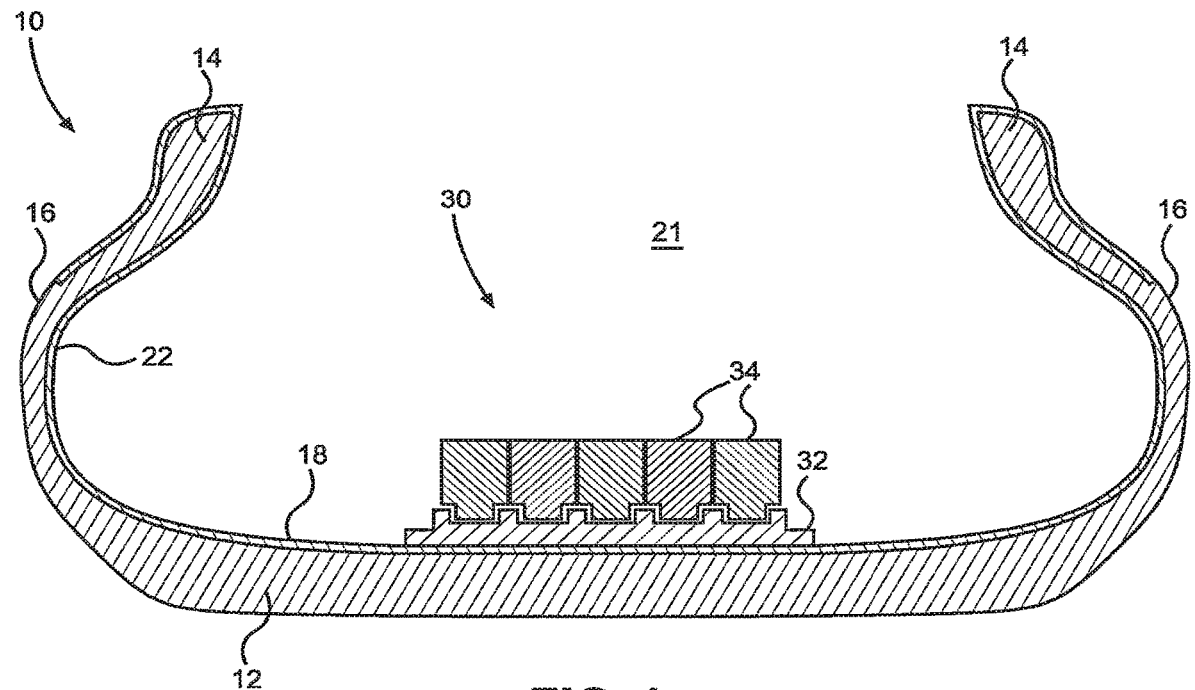
FIG. 1 is a schematic sectional view of a tire and an electronics assembly for use with the tire.

The structures illustrated in the drawings include examples of the elements recited in the claims. The illustrated structures thus include examples of how a person of ordinary skill in the art can make and use the claimed invention. They are described here to provide enablement and best mode without imposing limitations that are not recited in the claims. One or more elements of one embodiment may be used in combination with, or as a substitute for, one or more elements of another embodiment as needed for any particular implementation of the invention.

As shown in FIG. 1, a pneumatic tire 10 includes a tread 12, bead portions 14, and sidewalls 16 interconnecting the tread 12 with the bead portions 14. An inner surface 18 of the tire 10 defines the periphery of a cavity 21 within the tire 10. The inner surface 18 in this example is provided by an innerliner 22 that reaches fully throughout the interior of the tread 12, the bead portions 14, and the sidewalls 16.

Also shown in FIG. 1 is an electronics assembly 30 for use with the tire 10. The electronics assembly 30 in this example includes a base 32 and multiple modules 34. As shown schematically in FIG. 2, each module 34 includes one or more electronic devices 36. The devices 36 in the modules 34 may include air pressure sensors, temperature sensors, power generation or storage devices, radio frequency transmitters, radio frequency receivers, and/or any other electronic devices suitable for obtaining and/or providing information relating to conditions of the tire 10.

Figure 2:
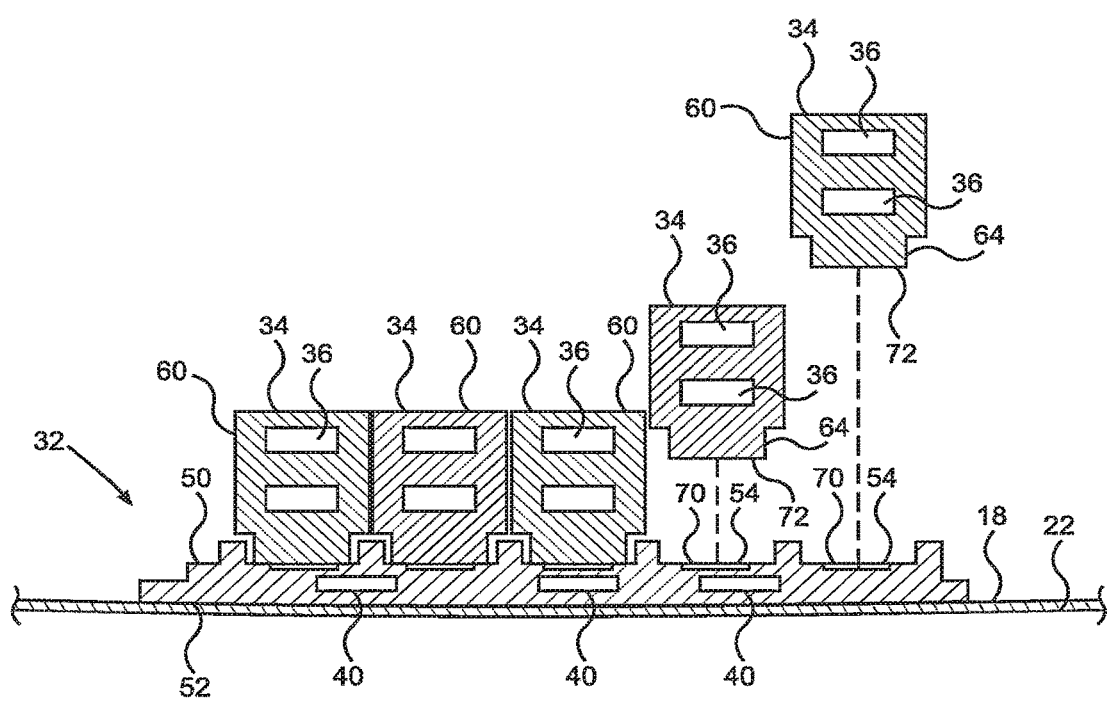
FIG. 2 is an enlarged view of parts shown in FIG. 1.

The base 32 also includes one or more electronic devices 40 (FIG. 2). These may include an electronic device 40 configured to provide a unique identification signal for identifying the tire 10 in distinction from another tire on the same vehicle or a different vehicle. Other electronic devices 40 in the base 32 may be configured to receive and/or transmit signals between the devices 40 in the base, the devices 36 in the modules 34, and the vehicle. In each case, the electronic devices 36 and 40 may be configured in any suitable manner known in the art.

The base 32 of the electronics assembly 30 is attached to the tire 10 at the interior of the tire 10. As shown schematically in FIG. 2, the base 32 includes a housing 50 containing the electronic devices 40. The housing 50 has a lower side surface 52 adhered to the inner surface 18 of the tire 10. Mechanical attachment elements 54 face upward from the housing 50. The mechanical attachment elements 54 are arranged side-by-side in a row.

Each of the modules 34 of FIG. 1 includes a housing 60 (FIG. 2) containing the respective electronic devices 36. A mechanical attachment element 64 faces downward from each housing 60. The mechanical attachment element 64 on each one of the modules 34 is configured to releasably mechanically attach to any one of the mechanical attachment elements 54 on the base 32. Accordingly, the modules 34 are interchangeably mechanically attachable to each other in side-by-side positions in a row. The mechanical attachment elements 54 and 64 shown schematically in the drawings can be configured to accomplish the releasable attachments in any suitable manner known in the art of interconnecting modular structures.

In addition to the mechanical attachment elements 54, the base 32 has electrical contacts 70 facing upward from the housing 50. The electrical contacts 70 are arranged side-by-side along the row of mechanical attachment elements 54. Each module 34 has an electrical contact facing 72 downward from the housing 60. The electrical contact 72 on each one of the modules 34 is configured to releasably electrically connect with any one of the electrical contacts 70 on the base 32. Accordingly, the modules 34 are interchangeably electrically connectable to the base 32 in side-by-side positions in a row.

The electrical contacts 72 and 74 shown schematically in the drawings can be provided as pin and socket connectors that also function as the mechanical attachment elements 54 and 64 described above. In other embodiments the electrical contacts 72 and 74 can be configured to accomplish the releasable electrical connections in any suitable manner known in the art of electrical contacts.

Figure 3:
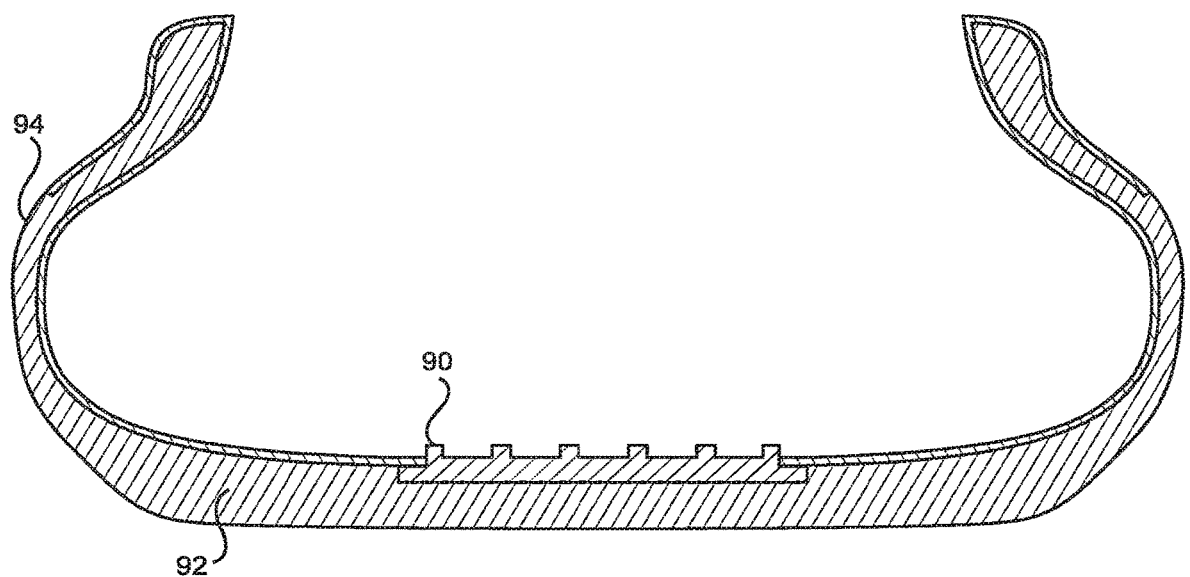
FIG. 3 is a schematic sectional view of an alternative embodiment of a tire and an electronics assembly for use with the tire.
Figure 4:
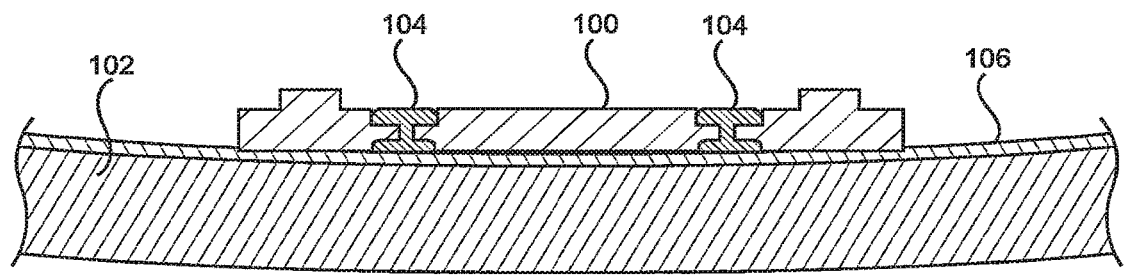
FIG. 4 is a schematic sectional view of alternative embodiment of a tire and an electronics assembly for use with the tire.
Figure 5:
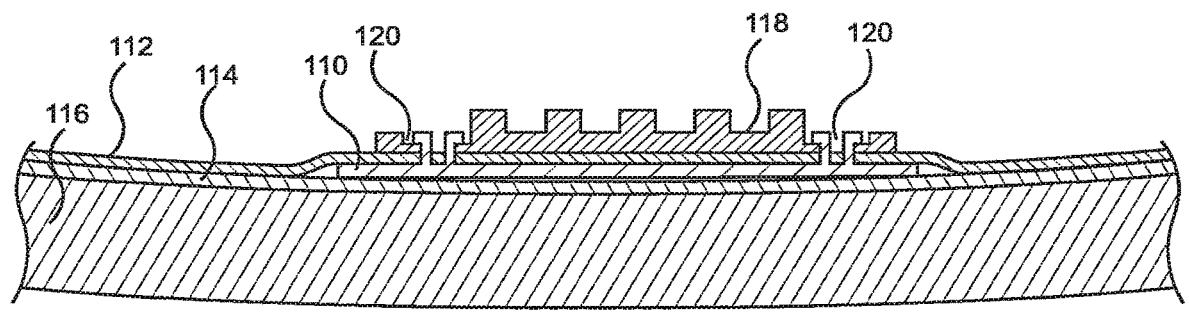
FIG. 5 also is a schematic sectional view of alternative embodiment of a tire and an electronics assembly for use with the tire.

FIGS. 3-5 show alternative embodiments of a base for use with modules like the modules 34 of FIGS. 1 and 2. As shown in FIG. 3, a base 90 that is substantially the same as the base 32 is embedded within the body of the tire in tread portion 92 of a tire 94. As shown in FIG. 4, a base 100 is attached to a tire 102 by fasteners 104 that are attached to an innerliner 106. As shown in FIG. 5, a support platform 110 is installed between layers 112 and 114 of a tire 116. The base 118 in this embodiment is mounted over the innermost layer 112 of the tire 116 and is retained in place by fasteners 120 projecting from the support platform 110 through the innermost layer 112.

This written description sets for the best mode of carrying out the invention and describes the invention so as to enable a person of ordinary skill in the art to make and use the invention, by presenting examples of the elements recited in the claims. The detailed descriptions of those elements do not impose limitations that are not recited in the claims.

What is claimed is:

1. An apparatus for use with a tire, comprising:
   a base mechanically attached to the tire, the base including a plurality of mechanical attachment elements arranged side-by-side in a row; and
   a plurality of modules, each of which contains an electronic device and has a mechanical attachment element, wherein each mechanical attachment element on a module is configured to releasably mechanically attach to any one of the mechanical attachment elements on the base.

2. An apparatus as defined in claim 1, wherein the base is configured to overlie an interior surface of the tire.

3. An apparatus as defined in claim 2, wherein the base is configured for embedded installation within the tire.

4. An apparatus as defined in claim 3, wherein the base is configured for installation between layers of the tire.

5. An apparatus as defined in claim 1, wherein the base includes an electronic device, and wherein the electronic device in the base is configured to provide a unique identification signal identifying the tire.

6. An apparatus as defined in claim 1, wherein the electronic devices in the modules include air pressure sensors.

7. An apparatus as defined in claim 1, wherein the electronic devices in the modules include temperature sensors.

8. An apparatus for use with a tire, comprising:
   a base mechanically attached to the tire, the base including a plurality of electrical contacts; and
   a plurality of modules, each of which contains an electronic device and has an electrical contact, wherein each lower contact on a module is configured to releasably electrically connect with any one of the electrical contacts on the base, whereby the modules are interchangeably electrically connectable with the base in side-by-side positions in a row.

9. An apparatus as defined in claim 8, wherein the base is configured to overlie an interior surface of the tire.

10. An apparatus as defined in claim 8, wherein the base is configured for embedded installation within the tire.

11. An apparatus as defined in claim 8, wherein the base is configured for installation between layers of the tire.

12. An apparatus as defined in claim 8, wherein the base includes an electronic device, and wherein the electronic device in the base is configured to provide a unique identification signal identifying the tire.

13. An apparatus as defined in claim 8, wherein the electronic devices in the modules include air pressure sensors.

14. An apparatus as defined in claim 8, wherein the electronic devices in the modules include temperature sensors.

15. An apparatus as defined in claim 8, wherein the base includes a plurality of mechanical attachment elements arranged side-by-side in a row, and each module includes a mechanical attachment element configured to releasably mechanically attach to any one of the mechanical attachments elements on the base, whereby the modules are interchangeably mechanically attachable to the base.

16. An apparatus comprising:
   a tire;
   a base mechanically attached to the tire, and further including a plurality of mechanical attachment elements arranged side-by-side in a row; and
   a plurality of modules, each of which contains an electronic device and has a mechanical attachment element, wherein each mechanical attachment on a module is configured to releasably mechanically attach to any one of the mechanical attachment elements on the base, whereby the modules are interchangeably mechanically attachable to the base.

17. An apparatus as defined in claim 16, wherein the base includes an electronic device, and wherein the electronic device in the base is configured to provide a unique identification signal identifying the tire.

18. An apparatus as defined in claim 16, wherein the base is configured for embedded installation within the tire.

19. An apparatus as defined in claim 16, wherein the base is configured for installation between layers of the tire.

20. An apparatus as defined in claim 16, wherein the base includes a plurality of electrical contacts arranged side-by-side in a row, and each module includes an electrical contact configured to releasably connect electrically with any one of the electrical contacts on the base, whereby the modules are interchangeably electrically connectable with the base.

* * * * *